United States Patent
Gasser

(10) Patent No.: US 8,616,877 B2
(45) Date of Patent: Dec. 31, 2013

(54) METHOD FOR PREHEATING CEMENT RAW MEAL, AND DEVICE FOR CARRYING OUT SAID METHOD

(75) Inventor: Urs Gasser, Rüfenach (CH)

(73) Assignee: Holcim Technology Ltd., Jona (CH)

( * ) Notice: Subject to any disclaimer, the term of this patent is extended or adjusted under 35 U.S.C. 154(b) by 1081 days.

(21) Appl. No.: 11/990,221

(22) PCT Filed: Aug. 11, 2006

(86) PCT No.: PCT/IB2006/002193
§ 371 (c)(1),
(2), (4) Date: Nov. 19, 2008

(87) PCT Pub. No.: WO2007/017747
PCT Pub. Date: Feb. 15, 2007

(65) Prior Publication Data
US 2009/0098497 A1  Apr. 16, 2009

(30) Foreign Application Priority Data
Aug. 11, 2005 (AT) .................... A 1354/2005

(51) Int. Cl.
 *F27B 15/02* (2006.01)
(52) U.S. Cl.
 USPC .............................................. 432/14; 432/58
(58) Field of Classification Search
 USPC .............................................. 432/14, 58, 106
 See application file for complete search history.

(56) References Cited

U.S. PATENT DOCUMENTS

| | | | | |
|---|---|---|---|---|
| 3,881,861 A | * | 5/1975 | Ritzmann | 432/106 |
| 3,986,818 A | * | 10/1976 | Deussner et al. | 432/14 |
| 4,022,568 A | * | 5/1977 | Meedom | 432/14 |
| 4,094,626 A | * | 6/1978 | Boyhont et al. | 432/58 |
| 4,218,210 A | * | 8/1980 | Herchenbach | 432/106 |
| 4,260,370 A | * | 4/1981 | Goldmann et al. | 432/14 |
| 4,334,860 A | * | 6/1982 | Herchenbach | 432/14 |
| 4,623,311 A | * | 11/1986 | Hatano et al. | 432/106 |
| 4,715,811 A | * | 12/1987 | Lawall | 432/58 |
| 6,254,382 B1 | | 7/2001 | Ramesohl et al. | |
| 6,447,598 B2 | | 9/2002 | Kuhnke et al. | |
| 6,468,075 B2 | | 10/2002 | Streit et al. | |
| 6,666,680 B2 | * | 12/2003 | Eckert et al. | 432/58 |

FOREIGN PATENT DOCUMENTS

| | | |
|---|---|---|
| DE | 28 52 754 A1 | 6/1980 |
| DE | 196 52 740 A1 | 6/1998 |
| DE | 199 62 536 A1 | 7/2001 |
| DE | 100 30 613 A1 | 1/2002 |

* cited by examiner

*Primary Examiner* — Gregory A Wilson
(74) *Attorney, Agent, or Firm* — Chapman and Cutler LLP

(57) ABSTRACT

In a method for the preheating of cement raw meal for the production of cement-clinker, in which the cement raw meal is conveyed towards the feed side of a cement clinker kiln (1) in at least one heat exchanger-line in counter flow to hot gases, the hot gases are drawn off via at least a first heat exchanger (2) connected with the feed end of the cement clinker kiln (1) and via heat exchanger-lines (3,4) following this first heat exchanger (2) and being parallel to each other. The device for carrying out said method is characterized in that heat exchanger-lines (3,4) arranged in parallel to each other are connected to at least a first heat exchanger (2) joined to the feed end of the cement clinker kiln.

4 Claims, 1 Drawing Sheet

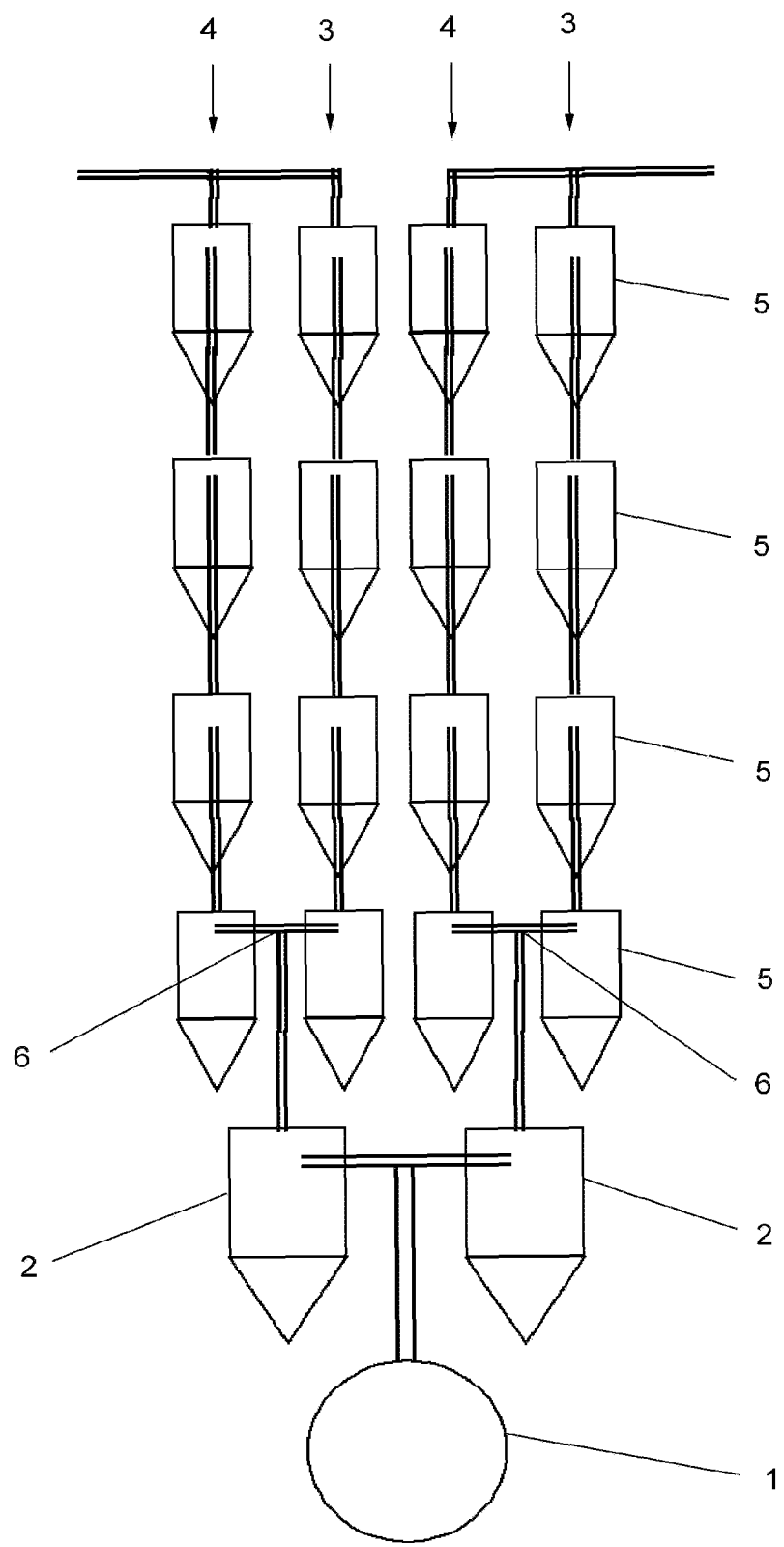

METHOD FOR PREHEATING CEMENT RAW MEAL, AND DEVICE FOR CARRYING OUT SAID METHOD

The invention relates to a method for the preheating of cement raw meal for the production of cement-clinker, in which the cement raw meal is conveyed towards the feed side of a cement clinker kiln (1) in at least one heat exchanger-line in counter flow to hot gases as well as to a device for carrying out said method.

In the production of cement clinker from cement raw meal it has already been proposed to carry out a preheating in at least one heat exchanger-line and, in particular, in cyclone/fluidized bed-heat exchanger-systems being passed through by the offgas of a rotary kiln, in which preheating and, at an appropriate temperature, also precalcining can be carried out. In this manner, the hot offgases of the rotary kiln can be thermally used whereby the cyclone/fluidized bed-heat exchangers normally used for these purposes are dimensioned for defined amounts of throughput. It is known to connect in series a plurality of such cyclone/fluidized bed-heat exchangers, so that hot process gas which leaves the rotary kiln at temperatures of at about 1100° C. it is cooled down in several steps to temperatures of 350° C. or even to 290° C., depending on the number of steps. The number of steps in turn generally depends on the requirements of drying of the respectively deployed material whereby the efficiency of heat transfer generally is determined by the dispersion of raw meal in the gas flow and an appropriately high degree of separation in the cyclone. The gradient of temperature as well as, as the case may be, losses due to radiation and the contact time being effective in each case have natural influence on the heat transfer.

With large rotary kilns or appropriately higher capacities of production appropriately larger preheaters are required in order to safeguard the continuous feed of the rotary kiln. To this end, it is already been proposed to run two heat exchanger-lines in parallel for safeguarding the feeding of the material into the rotary kiln by appropriate chutes. When further increasing the required amount of throughput such a concept necessarily leads to natural limits. While conventional fluidized bed-heat exchanger-lines are dimensioned for a throughput of 3500 to 4000 t per day and can be run with established cyclones at an appropriately high separation and with an appropriately low pressure drop, the excessive arrangement in parallel of such installations leads to problems with the space required at the feeding end of the rotary kiln. When using more than two of such lines, a logistic complication results at the feeding end of the rotary kiln for, in addition to the more than two feeding chutes, further feeding chutes are required for the run up of the clinker kiln which are equally connected at this place. Hence, when higher amounts of throughput are demanded, this would necessarily lead to fluidized bed-heat exchangers in appropriately larger in dimension and, in particular, to larger cyclones with diameters of 12 meters or more, would have to be used, whereby the enlargement is necessary in order to keep the pressure drop limited for an economic operation. Heat exchangers being this large, however, are not as stable in their operation, as heat exchangers of established standard size as been used hitherto. An appropriate enlargement of the number of heat exchanger-lines run in parallel to each other, however, leads to the problems in the design of the feeding chutes, as initially mentioned, and, in particular, because for a continuous and correct function, feeding has to be effected at specific angles in order to safeguard the run of the material into the rotary kiln.

It is, hence, an object of the invention to increase the amount of throughput of the heat exchanger without the occurrence of a higher pressure drop and, hence, a higher energy consumption at this stage whereby at the same time the properties of separation of the known installation shall be maintained as unchanged as possible. To solve this object, the inventive method departing from the initially mentioned method generally consists therein, that the hot gases are drawn off via at least a first heat exchanger connected with the feeding end of the cement clinker kiln and via heat exchanger-lines following this first heat exchanger and being arranged in parallel to each other. By effecting a splitting up in subsequent heat exchanger-lines being arranged in parallel to each other following at least a first heat exchanger connected with the feeding end of the cement clinker kiln, it is achieved to run the respective strands with generally equal pressure drops and to reduce the number of feeding chutes at the feeding end of the rotary kiln appropriately. The doubling of the strands following the first heat exchanger allows the doubling of the amounts of throughputs with heat exchangers in the single lines being generally dimensioned identical without the occurrence of complex constructional problems at the feeding end of the rotary kiln. Advantageously the method in this case is, however, carried out such, that the hot gases are drawn off via cyclone/fluidized bed-heat exchanger-lines in which the first cyclone/fluidized bed-heat exchanger in each case has a greater volume as compared to the heat exchangers of the subsequent cyclone/fluidized bed-heat exchanger-lines, whereby it is safeguarded that the streams of a raw meal coming from the heat exchanger-lines being arranged in parallel to each other, can reliably be processed in the first stage and can be transmitted without interruption.

The inventive device for the preheating of cement raw meal for the cement clinker production, having at least one heat exchanger-line for feeding cement raw meal in counter current to hot gases drawn off through the heat exchanger-line is generally characterized in that heat exchanger-lines arranged in parallel to each other, are connected to at least a first heat exchanger joined to the feed end to the cement clinker kiln. Such a construction allows for keeping the overall height of the preheater appropriately low and for uniformly employing heat exchangers which are distinguished by standardization and an appropriate reliability. The only constructive modification in such a device can in general be limited to the fact that the first heat exchanger has a greater volume than the heat exchangers following in the direction of the flow of the hot gases. Herein, the construction of the feeding chute and the feeding end of the rotary kiln does not need to be modified so that also here it can be resorted to established constructions. The slightly higher pressure drop coming along with the enlargement of the first heat exchanger can be counter balanced by the following heat exchanger-lines arranged in parallel to each other whereby the inventive embodiment is advantageously devised such that the heat exchangers are formed as cyclone/fluidized bed-heat exchangers.

In order to avoid the initially mentioned problems with the construction of the feeding chute the embodiment is advantageously devised such that at most two first cyclone/fluidized bed-heat exchangers are connected to the feeding chute for the precalciner and/or the clinker kiln, to which two cyclone heat exchanger-lines are connected in each case, whereby the cyclones connected to the feeding chute of the clinker kiln preferably have a greater diameter than the cyclones following the branching in the flow direction of the hot gases being drawn off. The branching leaves to the respective multiple of the heat exchanger-lines connected with the feeding chute or the clinker kiln via the first heat exchanger.

The invention will now be described in more detail by way of an exemplary embodiment depicted in the drawing. The drawing schematically shows a rotary kiln 1 to which two cyclone/fluidized bed-heat exchangers 2 are connected. These two first cyclone/fluidized bed-heat exchangers in each case are connected with two lines 3 or 4 of standard-cyclone/fluidized bed-heat exchangers 5 whereby above the cyclone/fluidized bed-heat exchangers 2 an appropriate branching, which is schematically indicated with 6, is provided. The single cyclone/fluidized bed-heat exchangers 5 can have the established dimensioning and construction whereby by the doubling of the lines the overall constructional height is appropriately reduced and the energy consumption can be minimized by an appropriate choice of the number of stages.

The invention claimed is:

1. Method for preheating of cement raw meal for production of cement clinker, comprising the step of
    conveying cement raw meal towards a feed end of a cement clinker kiln (1) through four separate heat exchanger-lines in counter flow to hot gases, each of said heat exchanger-lines comprising second cyclone/fluidized bed-heat exchangers (5) connected in series,
    wherein the hot gases are drawn off
        via two first heat exchangers (2) connected to the feed end of the cement clinker kiln (1), and
        via two of the heat exchanger-lines (3, 4) following each of the two first heat exchangers (2) in a direction of flow of the hot gases, so that the four separate heat exchanger-lines (3, 4) are arranged in parallel with each other, and
    wherein the two first heat exchangers (2) have a greater volume as compared to volumes of said second heat exchangers (5).

2. Device for preheating of cement raw meal for production of cement clinker, comprising
    at least two first heat exchangers (2) connected to a feed end of a cement clinker kiln (1), and
    four separate heat exchanger-lines (3, 4), each of said heat exchanger-lines comprising second cyclone/fluidized bed-heat exchangers (5) connected in series, for feeding cement raw meal in counter current to hot gases drawn off through the heat exchanger-line (3, 4), wherein
    two of the heat exchanger-lines (3, 4) are connected to and follow each of the first two heat exchangers (2) in a direction of flow of the hot gases,
    said two of the heat exchanger-lines (3, 4) connected to and following each of the first two heat exchangers (2) are arranged in parallel with each other, so that said four separate heat exchanger-lines (3, 4) are arranged in parallel with each other, and
    the two first heat exchangers (2) have a greater volume as compared to volumes of said second heat exchangers (5).

3. Device according to claim 2, wherein the two first heat exchangers (2)
    are cyclone/fluidized bed-heat exchangers, and
    are connected to a feeding chute for one or more of a precalciner and the clinker kiln (1).

4. Device according to claim 3, wherein the two first heat exchangers (2)
    are connected to the feeding chute of the clinker kiln (1), and
    have a greater diameter as compared to diameters of the second heat exchangers (5) following a branching in the direction of flow of the hot gases.

* * * * *